(12) United States Patent
Fujishima et al.

(10) Patent No.: US 8,659,177 B2
(45) Date of Patent: Feb. 25, 2014

(54) MOTIVE POWER REGENERATION SYSTEM FOR WORKING MACHINE (75) Inventors: Kazuo Fujishima, Tsuchiura (JP); Mitsuo Sonoda, Kasumigaura (JP); Seiji Hijikata, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/696,671

(22) PCT Filed: Jan. 20, 2012

(86) PCT No.: PCT/JP2012/051255
§ 371 (c)(1),
(2), (4) Date: Nov. 7, 2012

(87) PCT Pub. No.: WO2012/105345
PCT Pub. Date: Aug. 9, 2012

(65) Prior Publication Data
US 2013/0300128 A1    Nov. 14, 2013

(30) Foreign Application Priority Data

Feb. 3, 2011 (JP) ................................. 2011-022039

(51) Int. Cl.
*F02D 29/06* (2006.01)
(52) U.S. Cl.
USPC ........................................ 290/1 R; 290/40 C
(58) Field of Classification Search
USPC ................................. 290/1 R, 40 C
See application file for complete search history.

(56) References Cited

U.S. PATENT DOCUMENTS

| 4,476,679 | A | | 10/1984 | Sato |
| 5,056,312 | A | * | 10/1991 | Hirata et al. ..................... 60/426 |
| 6,055,851 | A | * | 5/2000 | Tanaka et al. ..................... 73/46 |
| 7,596,893 | B2 | * | 10/2009 | Tozawa et al. ................... 37/348 |

FOREIGN PATENT DOCUMENTS

| JP | 56-115428 A | 9/1981 |
| JP | 58-118303 A | 7/1983 |
| JP | 2003-329012 A | 11/2003 |
| JP | 2007-107616 A | 4/2007 |

OTHER PUBLICATIONS

International Preliminary Report on Patentability received in International Application No. PCT/JP2012/051255 dated Aug. 15, 2013.

* cited by examiner

*Primary Examiner* — Tho D Ta
(74) *Attorney, Agent, or Firm* — Mattingly & Malur, PC (57) ABSTRACT

A motive power regeneration apparatus for a working machine includes a regeneration circuit that is connected to a hydraulic line through which a returning fluid of a boom cylinder is distributed during a boom lowering operation. Also included are a hydraulic motor connected to a generator, a flow regulating circuit that is connected to the hydraulic line and provided with a control valve, an inverter that controls the flow rate on the regeneration circuit in accordance with a first flow rate setting which varies with the operation amount of an operating apparatus, and a control valve and a proportional valve that control the flow rate on the flow regulating circuit in accordance with a second flow rate setting which varies with the operation amount of the operating apparatus. Therefore, the motive power regeneration apparatus is capable of making an operator constantly feel comfortable with the working machine operations.

5 Claims, 5 Drawing Sheets

MOTIVE POWER REGENERATION SYSTEM FOR WORKING MACHINE

TECHNICAL FIELD

The present invention relates to an energy regeneration system for a construction machine or other working machine.

BACKGROUND ART

In recent years, there has been an increased demand for improvement in the fuel consumption rate (fuel efficiency) of a hydraulic excavator and other hydraulic working machines.

A hydraulic excavator disclosed, for instance, in JP,A2003-329012 is configured so that a changeover valve is installed in a hydraulic line (fluid return hydraulic line) in which a returning fluid is distributed when a boom connected to a bottom side hydraulic chamber of a boom cylinder (hydraulic cylinder) is lowered and that a regeneration circuit having a hydraulic motor and a generator coupled to the hydraulic motor is connected to a downstream end of the changeover valve. The hydraulic excavator is capable of changing the position of the changeover valve in accordance with an operation mode selected on a monitor panel. More specifically, the hydraulic excavator can selectively allow the regeneration circuit to communicate with the bottom side hydraulic chamber in accordance with the selected operation mode (e.g., the regeneration circuit communicates with the bottom side hydraulic chamber during an excavation, whereas the regeneration circuit does not communicate with the bottom side hydraulic chamber during a micromanipulation). If, for instance, the selected operation mode causes the regeneration circuit to communicate with the bottom side hydraulic chamber when the boom is lowered, the returning fluid discharged from the bottom side hydraulic chamber when the boom is lowered drives the hydraulic motor and the generator to generate a regenerative current. However, the hydraulic excavator does not achieve regeneration unless an appropriate operation mode is selected by an operator. Due to a complicated operation mode changeover procedure, regeneration might not readily be achieved when it is required.

A hydraulic excavator disclosed, for instance, in JP,A2007-107616 is developed in view of the above circumstances. This hydraulic excavator includes a branching unit, a regeneration circuit, and a flow regulating circuit. The branching unit branches a fluid return hydraulic line into two or more hydraulic lines. The regeneration circuit operates so that part of hydraulic fluid branched by the branching unit is introduced into a tank through a hydraulic motor connected to a generator. The flow regulating circuit operates so that the remaining hydraulic fluid branched by the branching unit is introduced into a tank through an orifice (flow regulating means), which changes a passage flow rate in accordance with the operation amount of a control lever. In other words, this hydraulic excavator aims at providing a proper amount of regenerated energy without causing an abrupt change in operability by controlling the flow rate of returning fluid introduced into the regeneration circuit and into the flow regulating circuit in accordance with the amount of control lever operation for boom lowering.

PRIOR ART LITERATURE

Patent Documents

Patent Document 1: JP,A2003-329012
Patent Document 2: JP,A2007-107616

SUMMARY OF THE INVENTION

Problem to be Solved by the Invention

Although Patent Document 2 states that the amount of returning fluid introduced into the regeneration circuit changes in accordance with the amount of control lever operation for boom lowering, it does not specifically indicate the amount of returning fluid that is discharged from a bottom side hydraulic chamber of a boom cylinder in accordance with the amount of control lever operation for boom lowering. In other words, if the relationship between the control lever operation amount and the meter-out flow rate for boom lowering (hereinafter may be referred to as the boom lowering meter-out flow rate) during a practical use of the above-described hydraulic excavator having a regeneration circuit is not equivalent to the one prevailing during the use of a normal hydraulic excavator (a hydraulic excavator that does not have a regeneration circuit and uses only an engine as a motive power source), the operator feels uncomfortable with a boom lowering operation.

An object of the present invention is to provide a motive power regeneration system for a working machine that is capable of making the operator constantly feel comfortable with machine operations no matter whether regeneration is achieved by the returning fluid from a hydraulic actuator.

Means for Solving the Problem (1) In accomplishing the above-mentioned object, according to one aspect of the present invention, there is provided a motive power regeneration system for a working machine having an operating apparatus that outputs an operation signal according to an operation amount, a hydraulic cylinder that performs a telescopic operation in accordance with the operation signal output from the operating apparatus, and a hydraulic pump that is driven by an engine to supply a hydraulic fluid to the hydraulic cylinder. The motive power regeneration system includes regeneration means, a regeneration circuit, a flow regulating circuit, a detector, first flow control means, and second flow control means. The regeneration means converts to an electrical energy the energy of the returning fluid from a bottom side hydraulic chamber of the hydraulic cylinder. The regeneration circuit is connected to the hydraulic chamber to introduce the returning fluid from the hydraulic chamber to a tank through the regeneration means. The flow regulating circuit is connected to the hydraulic chamber to introduce the returning fluid from the hydraulic chamber to a tank. The detector detects the operation amount of the operating apparatus. The first flow control means controls the flow rate on the regeneration circuit in accordance with the operation amount detected by the detector and with a first flow rate setting, which varies with the operation amount of the operating apparatus. The second flow control means controls the flow rate on the flow regulating circuit in accordance with the operation amount detected by the detector and with a second flow rate setting, which varies with the operation amount of the operating apparatus.

(2) According to another aspect of the present invention, there is provided the motive power regeneration system as described in (1) above, wherein the sum of the first and second flow rate settings increases with an increase in the operation amount of the operating apparatus.

(3) According to another aspect of the present invention, there is provided the motive power regeneration system as described in (2) above, wherein the first flow rate setting remains at zero when the operation amount of the operating apparatus is smaller than a first setting and increases with an increase in the operation amount of the operating apparatus when the operation amount of the operating apparatus is not smaller than the first setting, and wherein the second flow rate setting increases with an increase in the operation amount of the operating apparatus when the operation amount of the operating apparatus is smaller than the first setting, decreases with an increase in the operation amount of the operating apparatus when the operation amount of the operating apparatus is not smaller than the first setting and is smaller than a second setting, and remains at zero when the operation amount of the operating apparatus is not smaller than the second setting.

(4) According to another aspect of the present invention, there is provided the motive power regeneration system as described in (3) above, further including setting change means for changing at least either the first setting or the second setting to a different value.

(5) According to still another aspect of the present invention, there is provided the motive power regeneration system as described in (3) above, further includes setting changeover means for switching at least either the first setting or the second setting to a different value.

Advantage of the Invention

The present invention makes it possible to make the operator constantly feel comfortable with machine operations no matter whether regeneration is achieved by the returning fluid.

MODE FOR CARRYING OUT THE INVENTION

Figure 1:
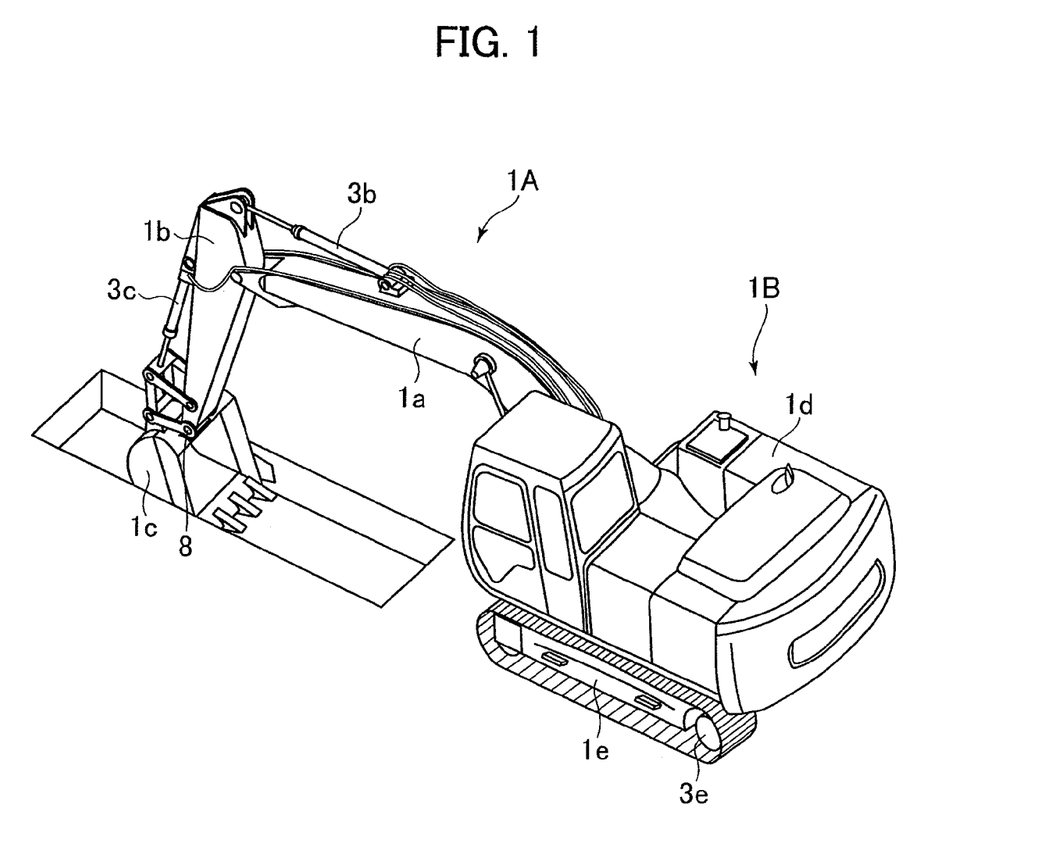
FIG. 1 is an external view of a hybrid hydraulic excavator according to an embodiment of the present invention.

An embodiment of the present invention will now be described with reference to the accompanying drawings. FIG. 1 is an external view of a hybrid hydraulic excavator according to the embodiment of the present invention. The hydraulic excavator shown in FIG. 1 includes a multijoint work device 1A having a boom 1a, an arm 1b, and a bucket 1c, and a vehicle body 1B having an upper swing structure 1d and a lower travel structure 1e. The boom 1a is pivotably supported by the upper swing structure 1d and driven by a boom cylinder (hydraulic cylinder) 3a.

The arm 1b is pivotably supported by the boom 1a and driven by an arm cylinder (hydraulic cylinder) 3b. The bucket 1c is pivotably supported by the arm 1b and driven by a bucket cylinder (hydraulic cylinder) 3c. The upper swing structure 1d is swingably driven by a swing motor (electric motor) 16 (see FIG. 2). The lower travel structure 1e is driven by left and right travel motors (hydraulic motors) 3e, 3f (see FIG. 2). The boom cylinder 3a, the arm cylinder 3b, the bucket cylinder 3c, and the swing motor 16 are driven under the control of operating apparatuses 4A, 4B (see FIG. 2), which are installed in a cab of the upper swing structure 1d to output a hydraulic signal.

Figure 2:
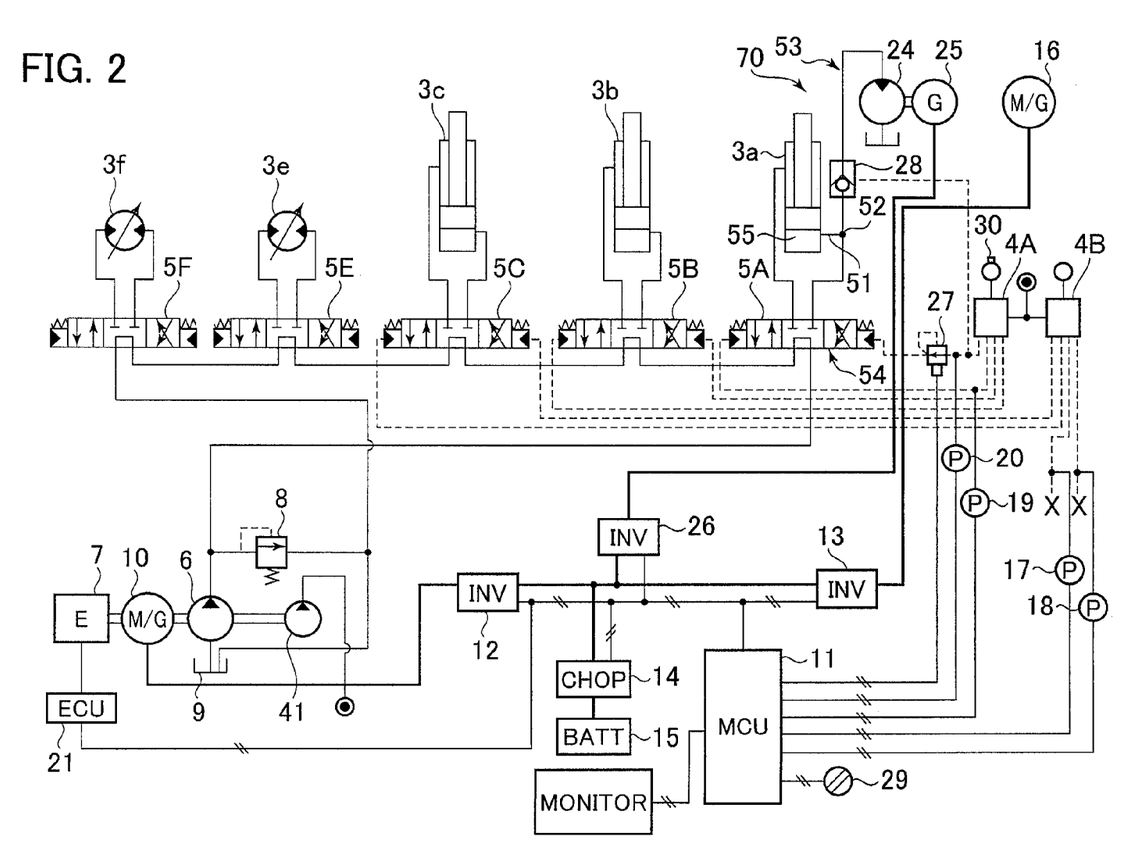
FIG. 2 is a schematic diagram illustrating a drive control system for the hydraulic excavator according to the embodiment of the present invention.

FIG. 2 is a schematic diagram illustrating a drive control system for the hydraulic excavator according to the embodiment of the present invention. Like elements in the accompanying drawings, including FIGS. 1 and 2, are designated by the same reference numerals and will not be redundantly described. The drive control system shown in FIG. 2 includes a motive power regeneration system 70, the operating apparatuses 4A, 4B, control valves (spool-type directional control valves) 5A, 5B, 5C, pressure sensors 17, 18 for converting a hydraulic signal to an electrical signal, an inverter 13, a chopper 14, a battery 15, and an inverter 12. The drive control system also includes a vehicle body controller (MCU) 11, a battery controller (BCU) 22, and an engine controller (ECU) 21 as control devices.

Referring to FIG. 2, the motive power regeneration system 70 includes a hydraulic line 51, a branching unit 52, a regeneration circuit 53, a flow regulating circuit 54, a pressure sensor 20, the vehicle body controller (MCU) 11, and an inverter 26.

The hydraulic line 51 is a returning fluid line for distributing a returning fluid (a fluid that returns to a tank 9 when the boom cylinder 3a contracts), and connected to a bottom side hydraulic chamber 55 of the boom cylinder 3a. The hydraulic line 51 includes the branching unit 52, which branches the hydraulic line 51 into a plurality of hydraulic lines. The branching unit 52 is connected to the regeneration circuit 53 and to the flow regulating circuit 54.

The regeneration circuit 53 includes a check valve 28 and a hydraulic motor 24, which is installed downstream of the check valve 28 and connected to a generator 25, and introduces the returning fluid from the bottom side hydraulic chamber 55 to the tank 9 through the hydraulic motor 24. When the fluid returning upon boom lowering is introduced into the regeneration circuit 53 to rotate the hydraulic motor 24, the generator 25 rotates to generate regenerative power.

An operation signal (hydraulic signal) output from the operating apparatus 4A when a boom lowering operation is performed by an operator is directed to the check valve 28. The check valve 28 is set to open upon receipt of an operation signal (a hydraulic signal representing a pressure P1 (see FIG. 4)) that is output when the amount of operation performed by the operating apparatus 4A during a boom lowering operation reaches a first setting L1 (described later). Therefore, when the operation amount of the operating apparatus 4A is not smaller than the first setting L1, the returning fluid is supplied to the hydraulic motor 24.

When the boom lowering operation is performed, the inverter 26 controls the revolution speed of the hydraulic motor 24 and of the generator 25. When the revolution speed of the hydraulic motor 24 is controlled by the inverter 26 as mentioned above, the flow rate of the fluid passing through the hydraulic motor 24 can be adjusted. This makes it possible to adjust the flow rate of the returning fluid that flows from the bottom side hydraulic chamber 55 to the regeneration circuit 53. In other words, the inverter 26 according to the present embodiment functions as flow control means for controlling the flow rate on the regeneration circuit 53.

The flow regulating circuit 54 operates so that the returning fluid from the bottom side hydraulic chamber 55 is introduced into the tank 9 through a control valve (spool-type directional control valve) 5A which acts as flow regulating means. An operation signal (hydraulic signal) output from the operating apparatus 4A through a proportional valve 27 during a boom lowering operation is input into one pressure receiving unit (a pressure receiving unit on the right side in FIG. 2) of the control valve 5A. Further, an operation signal (hydraulic signal) output from the operating apparatus 4A during a boom raising operation is input into the other pressure receiving unit (a pressure receiving unit on the left side in FIG. 2). A spool of the control valve 5A moves in accordance with the operation signals input into the above two pressure receiving units to change the direction and flow rate of the hydraulic fluid supplied from a hydraulic pump 6 to the boom cylinder 3a.

The proportional valve 27 operates so that an operation signal according to the amount of operation performed by the operating apparatus 4A during a boom lowering operation is output to the pressure receiving units of the control valve 5A. This operation signal output adjusts the flow rate of the returning fluid that passes through the control valve 5A from the bottom side hydraulic chamber 55 (that is, the flow rate of the returning fluid flowing in the flow regulating circuit 54). In other words, the proportional valve 27 according to the present embodiment functions as flow control means for controlling the flow rate on the flow regulating circuit 54.

A hydraulic signal output from the operating apparatus 4A during a boom lowering operation is input into the proportional valve 27 according to the present embodiment. The proportional valve 27 according to the present embodiment adjusts as needed the pressure of the hydraulic signal from the operating apparatus 4A in accordance with an output value input from a proportional valve output value computation unit 103 (described later) in the vehicle body controller 11, and outputs the adjusted hydraulic signal to the pressure receiving units of the control valve 5A. More specifically, the proportional valve 27 operates as described below during a boom lowering operation. (1) If the operation amount of the operating apparatus 4A is smaller than the later-described first setting L1, the proportional valve 27 is held in a position (fully-open position) shown in FIG. 2 to output the hydraulic signal from the operating apparatus 4A on an "as is" basis. (2) If the operation amount of the operating apparatus 4A is not smaller than the first setting L1 and is smaller than a second setting L2 (the second setting L2 is a value greater than the value of the first setting L1), the proportional valve 27 adjusts the hydraulic signal so that the flow rate of the returning fluid passing through the control valve 5A changes as indicated in a later-described metering diagram (see FIG. 4) in accordance with the operation amount of the operating apparatus 4A (i.e., the proportional valve 27 decreases a pilot pressure). (3) If the operation amount of the operating apparatus 4A is not smaller than the second setting L2, the proportional valve 27 blocks the input of the hydraulic signal from the operating apparatus 4A to the control valve 5A in order to prevent the returning fluid from passing through the control valve 5A (i.e., the proportional valve 27 fully closes to hold the control valve 5A in a neutral position shown in FIG. 2).

The pressure sensor 20 is used to detect the pressure (pilot pressure) of the hydraulic signal that is output from the operating apparatus 4A to the control valve 5A during a boom lowering operation, and mounted in a pilot line (hydraulic line) for connecting the operating apparatus 4A to the pressure receiving units of the control valve 5A. The pressure sensor 20, which is connected to the vehicle body controller 11, converts a detected pressure value, which is indicated by the hydraulic signal, to an electrical signal, and outputs the electrical signal to the vehicle body controller 11. As the pressure of the hydraulic signal output from the operating apparatus 4A is proportional to the operation amount of the operating apparatus 4A, the amount of operation performed by the operating apparatus 4A during a boom lowering operation can be calculated from the pressure of the hydraulic signal, which is detected by the pressure sensor 20. In other words, the pressure sensor 20 according to the present embodiment functions as means for detecting the operation amount of the operating apparatus 4A (operation amount detection means). A position sensor for detecting the position of a control lever of the operating apparatus 4A may also be used as the means for detecting the operation amount of the operating apparatus 4A.

The operating apparatus 4A, 4B decompress the hydraulic fluid supplied from a pilot pump 41 connected to an engine 7 to a secondary pressure and generate a hydraulic signal for controlling the boom cylinder 3a, the arm cylinder 3b, the bucket cylinder 3c, and the swing motor 16.

The operating apparatus 4A is connected through a pilot line to the pressure receiving units of the control valve 5A, which controls the drive of the boom cylinder 3a, and to the pressure receiving units of the control valve 5B, which controls the drive of the arm cylinder 3b, in order to output a hydraulic signal to the pressure receiving units of the control valves 5A, 5B in accordance with the direction in which the control lever is tilted. The positions of the control valves 5A, 5B are changed in accordance with the hydraulic signal input from the operating apparatus 4A to control the flow of the hydraulic fluid discharged from the hydraulic pump 6 in accordance with the valve positions changed, thereby controlling the drive of the boom cylinder 3a and of the arm cylinder 3b.

The operating apparatus 4B is connected through two pilot lines to the pressure receiving units of the control valve 5C which controls the drive of the bucket cylinder 3c, in order to output a hydraulic signal to the pressure receiving units of the control valve 5C in accordance with the direction in which the control lever is tilted. The position of the control valve 5C is changed in accordance with the hydraulic signal input from the operating apparatus 4B to control the flow of the hydraulic fluid discharged from the hydraulic pump 6 in accordance with the valve position changed, thereby controlling the drive of the bucket cylinder 3c.

The operating apparatus 4B is also connected to two additional pilot lines as well as the aforementioned two pilot lines connected to the pressure receiving units of the control valve 5C. Pressure sensors 17, 18 are mounted in the additional two pilot lines. More specifically, the pressure sensor 17 is mounted in the pilot line that allows the passage of a hydraulic signal for driving the swing motor 16 in such a manner as to swing the upper swing structure 1d counterclockwise, and the pressure sensor 18 is mounted in the pilot line that allows the passage of a hydraulic signal (hydraulic fluid) for driving the swing motor 16 in such a manner as to swing the upper swing structure 1d clockwise. The pressure sensors 17, 18 function as signal conversion means for detecting the pressure of the hydraulic signal output from the operating apparatus 4B and converting the detected pressure to an equivalent electrical signal and is capable of outputting the resulting electrical signal to the vehicle body controller 11. The electrical signal output from the pressure sensors 17, 18 to the vehicle body controller 11 is used as an operation signal for controlling the drive of the swing motor 16 (electric actuator) through the inverter 13.

Pressure receiving units of control valves 5E, 5F are connected through a pilot line to a travel operating apparatus (not shown) installed in the cab. The positions of the control valves 5E, 5F are changed in accordance with a hydraulic signal input from the travel operating apparatus to control the flow of the hydraulic fluid discharged from the hydraulic pump 6 in accordance with the valve positions changed, thereby controlling the drive of the travel motors 3e, 3f.

The vehicle body controller (MCU) 11 is capable of calculating the flow rate of the returning fluid that divergently flows from the bottom side hydraulic chamber 55 of the boom cylinder 3a to the regeneration circuit 53, calculating the flow rate of the returning fluid that divergently flows from the bottom side hydraulic chamber 55 to the flow regulating circuit 54, and controlling the inverter 13 and the control valve 5A so that the returning fluids having the calculated flow rates flow into the above two circuits 53, 54. Further, the vehicle body controller 11 is connected to the inverter 13 and to the proportional valve 27 to output an operation signal to them. Furthermore, the vehicle body controller 11 is connected to the pressure sensor 20 to input a value detected by the pressure sensor 20.

The vehicle body controller 11 also controls the drive of the swing motor 16 through the inverter 13 in accordance with an electrical signal input from the pressure sensors 17, 18. More specifically, when the electrical signal is input from the pressure sensor 17, the vehicle body controller 11 swings the upper swing structure 1d counterclockwise at a speed corresponding to the input electrical signal. When, on the other hand, the electrical signal is input from the pressure sensor 18, the vehicle body controller 11 swings the upper swing structure 1d clockwise at a speed corresponding to the input electrical signal. Further, when the swing of the upper swing structure 1d is braked, the vehicle body controller 11 exercises motive power regeneration control to recover an electrical energy from the swing motor 16. In addition, the vehicle body controller 11 exercises control to charge the battery 15 with regenerative power generated during the motive power regeneration control and with extra power generated by a motive power converter (generator motor) 10 (when, for instance, the load imposed on the hydraulic pump 6 is light).

A flow regulating function that is exercised for the returning fluid from the bottom side hydraulic chamber 55 by the vehicle body controller 11 according to the present embodiment will now be described with reference to the accompanying drawings.

Figure 3:
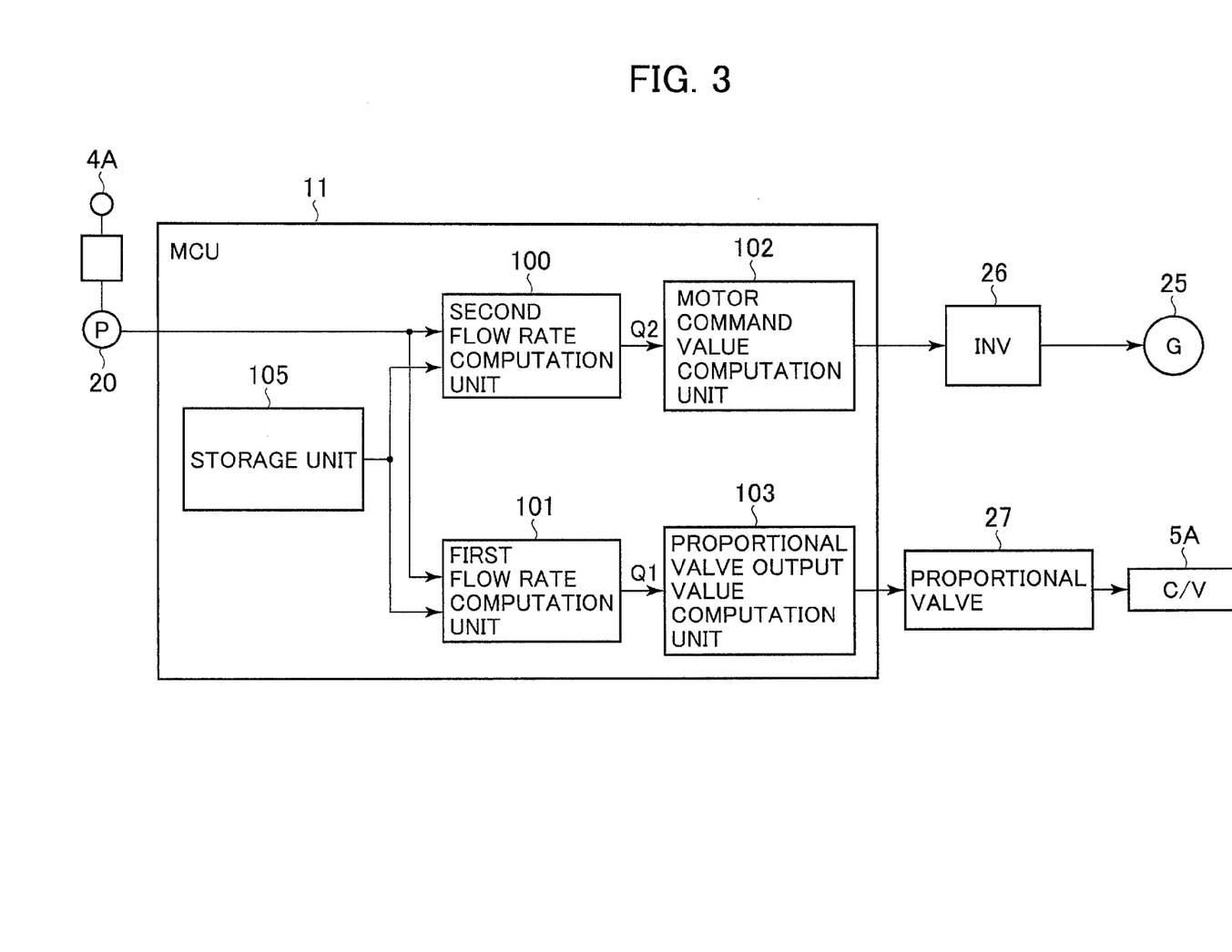
FIG. 3 is a diagram illustrating the configuration of a vehicle body controller 11 according to the embodiment of the present invention.

FIG. 3 is a diagram illustrating the configuration of the vehicle body controller 11 according to the embodiment of the present invention. The vehicle body controller 11 shown in FIG. 3 includes a storage unit (storage means) 105, a first flow rate computation unit 101 (flow rate computation means), a second flow rate computation unit 100 (flow rate computation means), a motor command value computation unit 102, and a proportional valve output value computation unit 103. The storage unit 105 includes, for example, a ROM and a RAM.

Figure 4:
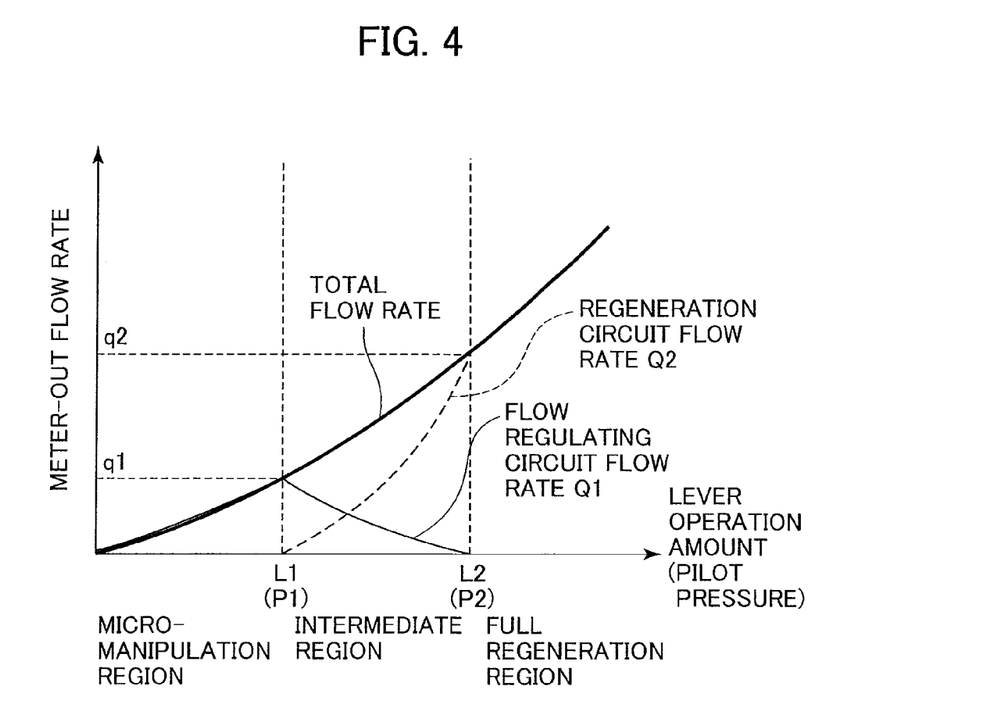
FIG. 4 is a metering diagram stored in a storage unit 105 according to the embodiment of the present invention.

The storage unit 105 stores the relationship between the rate of a meter-out flow from the bottom side hydraulic chamber 55 and the amount of operation performed by the operating apparatus 4A during a boom lowering operation (in which the boom cylinder 3a is contracted) as well as the operation amount settings (first setting L1 and second setting L2) for the operating apparatus 4A that are used as criteria for selecting a circuit to which the returning fluid flows during boom lowering. FIG. 4 is a metering diagram stored in the storage unit 105 according to the embodiment of the present invention. In the present embodiment, the relationship between the rate of the meter-out flow from the bottom side hydraulic chamber 55 and the amount of operation performed by the operating apparatus 4A during a boom lowering operation is stored in the form of a metering diagram as shown in FIG. 4.

Referring to FIG. 4, a metering curve indicated by a thin solid line represents the relationship between the operation amount of the operating apparatus 4A and the flow rate of the returning fluid flowing in the flow regulating circuit 54 (flow regulating circuit flow rate Q1). A metering curve indicated by a broken line represents the relationship between the operation amount of the operating apparatus 4A and the flow rate of the returning fluid flowing in the regeneration circuit 53 (regeneration circuit flow rate Q2). A metering curve indicated by a thick solid line is a combination of the above two metering curves and represents a total flow rate that is obtained by adding the flow regulating circuit flow rate Q1 to the regeneration circuit flow rate Q2. This metering curve is set in the same manner as a metering curve that is obtained when the returning fluid from the bottom side hydraulic chamber 55 entirely flows into the flow regulating circuit 54 only (that is, a metering curve for a hydraulic excavator that does not include the regeneration circuit 53 and uses only an engine as a motive power source (hereinafter may be referred to as a normal hydraulic excavator)).

As indicated by the above metering curves, the total flow rate is equal to the flow regulating circuit flow rate Q1 when the operation amount of the operating apparatus 4A is smaller than the first setting L1 (this region may be hereinafter referred to as the micromanipulation region). In this instance, the returning fluid from the bottom side hydraulic chamber 55 entirely flows into the flow regulating circuit 54, and the regeneration circuit 53 is closed by the check valve 28. The reason why the present embodiment causes the returning fluid to flow into only the flow regulating circuit 54 in the micromanipulation region is that the micromanipulation capability (inching performance) of the boom cylinder 3a is important in the micromanipulation region. From the viewpoint of assurance of inching performance, it is preferred that flow control be exercised by only the control valve 5A which provides better flow control than the hydraulic motor 24.

Further, when the operation amount of the operating apparatus 4A is not smaller than the second setting L2 (greater than the first setting L1) (this region may be hereinafter referred to as the full regeneration region), the total flow rate is equal to the regeneration circuit flow rate Q2. In this instance, the returning fluid from the bottom side hydraulic chamber 55 entirely flows into the regeneration circuit 53, and the flow regulating circuit 54 is closed by the control valve 5A. The reason why the present embodiment causes the returning fluid to flow into only the regeneration circuit 53 in the full regeneration region is that a large amount of returning fluid is generated in the full regeneration region in which the operation amount of the operating apparatus 4A is large. From the viewpoint of enhancement of fuel efficiency, it is preferred that the returning fluid be used to increase the amount of regeneration.

When, on the other hand, the operation amount is not smaller than the first setting L1 and is smaller than the second setting L2 (this region may be hereinafter referred to as the intermediate region), the returning fluid flows into both the regeneration circuit 53 and the flow regulating circuit 54. More specifically, when the operation amount of the operating apparatus 4A increases from the first setting L1 to the second setting L2, the flow regulating circuit flow rate Q1 gradually decreases to zero from a total flow rate q1 prevailing at the first setting L1 while the regeneration circuit flow rate Q2 gradually increases from zero to a total flow rate q2 prevailing at the second setting L2. As described above, if, in the intermediate region, the flow regulating circuit flow rate Q1 gradually decreases while the regeneration circuit flow rate Q2 gradually increases, a smooth transition from the micromanipulation region to the full regeneration region can occur. In addition, a smooth transition from the full regeneration region to the micromanipulation region can also occur. In this instance, as described earlier, the sum of the flow regulating circuit flow rate Q1 and the regeneration circuit flow rate Q2 is set to be equal to the flow rate provided by a normal hydraulic excavator.

Returning to FIG. 3, the first flow rate computation unit 101 calculates the flow rate Q1 of the returning fluid flowing into the flow regulating circuit 54 in accordance with the metering diagram stored in the storage unit 105 and with the amount of operation performed by the operating apparatus 4A during a boom lowering operation, whereas the second flow rate computation unit 100 calculates the flow rate Q2 of the returning fluid flowing into the regeneration circuit 53 in accordance with the metering diagram stored in the storage unit 105 and with the amount of operation performed by the operating apparatus 4A during a boom lowering operation.

A value detected by the pressure sensor 20 is input into the first and second flow rate computation units 101, 100. The first and second flow rate computation units 101, 100 calculate the operation amount of the operating apparatus 4A in accordance with the detected value. Here, it is assumed that the pressure of a hydraulic signal generated when the operation amount of the operating apparatus 4A is equal to the first setting L1 is P1, and that the pressure of a hydraulic signal generated when the operation amount is equal to the second setting L2 is P2 (FIG. 4 shows both the operation amount settings L1, L2 and the pressure settings P1, P2). When the operation amount of the operating apparatus 4A is calculated in accordance with the value detected by the pressure sensor 20, the flow rates Q1, Q2 corresponding to the calculated operation amount are calculated in accordance with the metering diagram stored in the storage unit 105 and set as target flow rates for the associated circuits 53, 54. The first flow rate computation unit 101 outputs the calculated flow regulating circuit flow rate Q1 to the proportional valve output value computation unit 103, whereas the second flow rate computation unit 100 outputs the calculated regeneration circuit flow rate Q2 to the motor command value computation unit 102.

The motor command value computation unit 102 computes the revolution speed of the hydraulic motor 24 that is required when the hydraulic motor 24 for the regeneration circuit 53 provides the regeneration circuit flow rate Q2 computed by the second flow rate computation unit 100, and outputs a revolution speed command value for rotating the hydraulic motor 24 at the computed revolution speed to the inverter 26. Upon input of the revolution speed command value computed by the motor command value computation unit 102, the inverter 26 rotates the hydraulic motor 24 and the generator 25 in accordance with the revolution speed command value. The returning fluid then flows into the regeneration circuit 53 at the flow rate computed by the second flow rate computation unit 100.

The proportional valve output value computation unit 103 computes an output value of the proportional valve 27 that is required for the fluid to pass through the control valve 5A of the flow regulating circuit 54 at the flow regulating circuit flow rate Q1 computed by the first flow rate computation unit 101 (that is, the pressure of the hydraulic signal output from the proportional valve 27 to the pressure receiving units of the control valve 5A (pilot pressure)), and outputs a command value to the proportional valve 27 so that the proportional valve 27 outputs the computed output value. Upon input of the output value computed by the proportional valve output value computation unit 103, the proportional valve 27 outputs an operation signal to the control valve 5A in accordance with the output value. The returning fluid then flows into the flow regulating circuit 54 at the flow rate computed by the first flow rate computation unit 101.

Returning to FIG. 2, the engine controller (ECU) 21 receives a command, for instance, from an engine revolution speed input device (e.g., an engine control dial (not shown)) through which the operator inputs a target revolution speed of the engine 7, and controls a fuel injection amount and an engine revolution speed in compliance with the command so that the engine 7 rotates at the target revolution speed.

The motive power converter (generator motor) 10 is coupled to an output shaft of the engine (prime mover) 7. The hydraulic pump 6 and the pilot pump 41 are connected to an output shaft of the motive power converter 10.

The motive power converter 10 drives hydraulic actuators 3a, 3b, 3c, 3e, 3f by using either or both of the driving force of the engine 7 and the electrical energy stored in the battery 15. The motive power converter 10 is connected to the inverter 13 and to the chopper 14 through the inverter 12, functions as a generator that converts the motive power of the engine 7 to an electrical energy and outputs the electrical energy to the inverters 12, 13, and also functions as an electric motor that assist-drives the hydraulic pump 6 by using part of the electrical energy stored in the battery 15.

The hydraulic pump 6 is a main pump that supplies a hydraulic fluid to the hydraulic actuators 3a, 3b, 3c, 3e, 3f. The pilot pump 41 supplies a hydraulic fluid that is output to the control valves 5A, 5B, 5C, 5D, 5E, 5F as an operation signal through the operating apparatus 4A, 4B and the travel operating apparatus. A relief valve 8 is installed in a hydraulic line connected to the hydraulic pump 6. When the pressure in the hydraulic line excessively rises, the relief valve 8 allows the hydraulic fluid to flow into the tank 9.

The inverter 12 controls the revolution speed of the motive power converter 10. Upon receipt of the electrical energy from the battery 15, the inverter 12 supplies electrical power to the motive power converter 10 to assist-drive the hydraulic pump 6. The inverter 13 controls the revolution speed of the swing motor 16. The inverter 13 receives electrical power output from the motive power converter 10 or the electrical energy stored in the battery 15 and supplies the received electrical power or electrical energy to the swing motor 16.

The battery 15 adjusts a voltage through the chopper 14, supplies electrical power to the inverters 12, 13, and stores electrical energy generated by the motive power converter 10 or supplied from the swing motor 16.

In the motive power regeneration system configured as described above, when the amount of operation performed by the operating apparatus 4A during a boom lowering operation is smaller than the first setting L1, the pressure detected by the pressure sensor 20 is lower than P1 so that the rate of the meter-out flow from the bottom side hydraulic chamber 55 is controlled in the micromanipulation region shown in FIG. 4. Thus, the second flow rate computation unit 100 in the vehicle body controller 11 outputs a regeneration circuit flow rate Q2 of 0 (zero) to the motor command value computation unit 102 in accordance with the metering diagram shown in FIG. 4. Further, the first flow rate computation unit 101 computes the operation amount of the operating apparatus 4A from the value detected by the pressure sensor 20, then computes the flow regulating circuit flow rate Q1 in accordance with the computed operation amount and with the metering diagram shown in FIG. 4, and outputs the computed flow regulating circuit flow rate Q1 to the proportional valve output value computation unit 103.

The motor command value computation unit 102 outputs the revolution speed command value, which is generated in accordance with the result of computation performed by the second flow rate computation unit 100, to the inverter 26. In accordance with the revolution speed command value, the inverter 26 keeps the hydraulic motor 24 and the generator 25 stopped. In this instance, the pressure of the hydraulic signal output from the operating apparatus 4A to the check valve 28 is lower than P1. Therefore, the check valve 28 remains closed. Hence, the returning fluid from the bottom side hydraulic chamber 55 does not flow to the regeneration circuit 53 (hydraulic motor 24) without regard to the revolution speed command value output from the motor command value computation unit 102 to the inverter 26.

Meanwhile, in accordance with the result of computation performed by the first flow rate computation unit 101, the proportional valve output value computation unit 103 outputs a command value to the proportional valve 27 to keep it fully open. The hydraulic signal output from the operating apparatus 4A then directly works on the pressure receiving units of the control valve 5A to move the spool of the control valve 5A. This causes the returning fluid to flow into the flow regulating circuit 54 at a flow rate corresponding to the operation amount of the operating apparatus 4A, as is the case with a normal hydraulic excavator.

When the amount of operation performed by the operating apparatus 4A during a boom lowering operation is not smaller than the first setting L1 and is smaller than the second setting L2, the pressure detected by the pressure sensor 20 is not lower than P1 and is lower than P2 so that the rate of the meter-out flow from the bottom side hydraulic chamber 55 is controlled in the intermediate region shown in FIG. 4. Thus, the first and second flow rate computation units 101, 100 in the vehicle body controller 11 compute the operation amount of the operating apparatus 4A from the value detected by the pressure sensor 20, and then compute the regeneration circuit flow rate Q2 and the flow regulating circuit flow rate Q1 in accordance with the computed operation amount and with the metering diagram shown in FIG. 4. Next, the first flow rate computation unit 101 outputs the computed flow regulating circuit flow rate Q1 to the proportional valve output value computation unit 103, whereas the second flow rate computation unit 100 outputs the computed regeneration circuit flow rate Q2 to the motor command value computation unit 102.

The motor command value computation unit 102 outputs the revolution speed command value, which is generated in accordance with the result of computation performed by the second flow rate computation unit 100, to the inverter 26. In accordance with the revolution speed command value, the inverter 26 controls the revolution speed of the hydraulic motor 24 and of the generator 25. In this instance, the pressure of the hydraulic signal output from the operating apparatus 4A to the check valve 28 is not lower than P1. Therefore, the check valve 28 remains open so that the bottom side hydraulic chamber 55 is in communication with the regeneration circuit 53. Hence, the returning fluid maintained at the regeneration circuit flow rate Q2 flows from the bottom side hydraulic chamber 55 to the regeneration circuit 53. Consequently, the hydraulic motor 24 rotates at the revolution speed computed by the motor command value computation unit 102 to generate regenerative power.

Meanwhile, the proportional valve output value computation unit 103 operates so that a command value generated in accordance with the result of computation performed by the first flow rate computation unit 101 is output to the proportional valve 27. The proportional valve 27 operates so that a hydraulic signal reduced to an output value (pressure) computed by the proportional valve output value computation unit 103 is output to the pressure receiving units of the control valve 5A. The spool of the control valve 5A then moves as needed. Hence, the returning fluid maintained at the flow regulating circuit flow rate Q1 flows into the flow regulating circuit 54.

When the amount of operation performed by the operating apparatus 4A during a boom lowering operation is not smaller than the second setting L2, the pressure detected by the pressure sensor 20 is not lower than P2 so that the rate of the meter-out flow from the bottom side hydraulic chamber 55 is controlled in the full regeneration region shown in FIG. 4. Thus, the second flow rate computation unit 100 in the vehicle body controller 11 computes the operation amount of the operating apparatus 4A from the value detected by the pressure sensor 20, then computes the regeneration circuit flow rate Q2 in accordance with the computed operation amount and with the metering diagram shown in FIG. 4, and outputs the computed regeneration circuit flow rate Q2 to the motor command value computation unit 102. Further, the first flow rate computation unit 101 outputs a flow regulating circuit flow rate Q1 of 0 (zero) to the proportional valve output value computation unit 103 in accordance with the metering diagram shown in FIG. 4.

The motor command value computation unit 102 outputs the revolution speed command value, which is generated in accordance with the result of computation performed by the second flow rate computation unit 100, to the inverter 26. In accordance with the revolution speed command value, the inverter 26 controls the revolution speed of the hydraulic motor 24 and of the generator 25. In this instance, too, the pressure of the hydraulic signal output from the operating apparatus 4A to the check valve 28 is not lower than P1. Therefore, the bottom side hydraulic chamber 55 is in communication with the regeneration circuit 53. This causes the returning fluid from the bottom side hydraulic chamber 55 entirely to flow into the regeneration circuit 53. As a result, the hydraulic motor 24 rotates at the revolution speed computed by the motor command value computation unit 102 to generate regenerative power.

Meanwhile, in accordance with the result of computation performed by the first flow rate computation unit 101, the proportional valve output value computation unit 103 outputs a command value to the proportional valve 27 to keep it fully closed. The hydraulic signal output from the operating apparatus 4A is then blocked so that the spool of the control valve 5A is held in a neutral position. This causes the returning fluid from the bottom side hydraulic chamber 55 not to pass through the control valve 5A.

The motive power regeneration system according to the embodiment of the present invention, which is configured as described above, operates so that the total flow rate (meter-out flow rate) of the returning fluid discharged from the bottom side hydraulic chamber 55 during a boom lower operation is constantly controlled in accordance with the metering diagram shown in FIG. 4. This makes the operator constantly feel comfortable with machine operations. Further, when the metering diagram used for the flow control of the returning fluid is the same as the one used for a normal hydraulic excavator, as is the case with the present embodiment, the operator can constantly feel comfortable with machine operations no matter whether regeneration is achieved by the returning fluid.

Further, the present embodiment not only uses the same metering diagram as that in a normal hydraulic excavator, but also changes the circuit in which the returning fluid flows and the flow rate of the returning fluid in each circuit in accordance with the operation amount of the operating apparatus 4A. When circuit and flow rate changes are made appropriately as described above, it is possible to arbitrarily and easily define the balance between (1) micromanipulation capability improvement, which is achieved mainly by allowing the returning fluid to flow in the flow regulating circuit 54, and (2) fuel efficiency improvement, which is achieved mainly by allowing the returning fluid to flow in the regeneration circuit 53.

In the above respect, the embodiment described above allows the returning fluid to flow in only the flow regulating circuit 54 in the micromanipulation region, and allows the returning fluid to flow in only the regeneration circuit 53 in the full regeneration region. When the circuit in which the returning fluid flows is appropriately changed in accordance with the operation amount of the operating apparatus 4A as described above, adequate inching performance can be obtained in the micromanipulation region where micromanipulation capability is important. Further, the fuel efficiency can be improved in the full regeneration region where an increased amount of regeneration is expected due to a high flow rate of the returning fluid. Moreover, in the intermediate region, which is positioned between the micromanipulation region and the full regeneration region, the above-described embodiment gradually decreases the flow regulating circuit flow rate Q1 and gradually increases the regeneration circuit flow rate Q2 in accordance with an increase in the operation amount of the operating apparatus 4A. When the flow rate of the returning fluid is controlled in the intermediate region as described above, a smooth transition can be achieved between the micromanipulation region where the micromanipulation capability is important and the full regeneration region where the fuel efficiency is important.

The embodiment described above uses fixed operation amounts (first setting L1 and second setting L2) of the operating apparatus 4A as reference values for selecting a circuit in which the returning fluid flows during a boom lowering operation. Alternatively, however, these operation amounts (first setting L1 and second setting L2) may be changeable by the operator.

Figure 5:
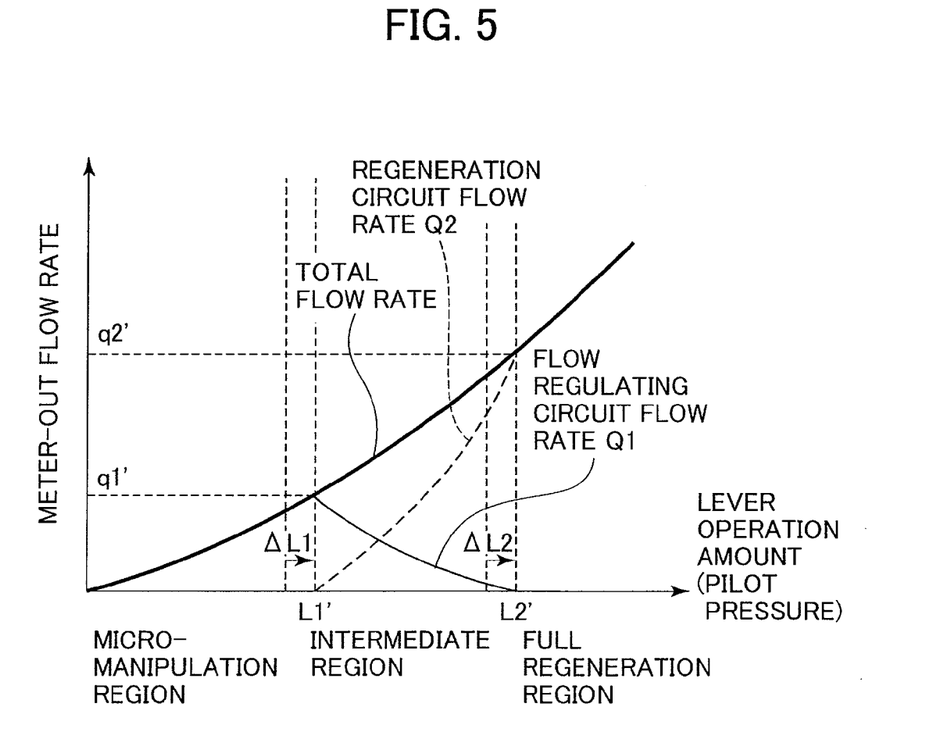
FIG. 5 is a metering diagram that is obtained when a first setting L1 and a second setting L2 are respectively changed to new settings L1', L2' in the embodiment of the present invention.

FIG. 5 is a metering diagram that is obtained when the first setting L1 and the second setting L2 are respectively changed to new settings L1', L2' in the embodiment of the present invention. As indicated in FIG. 5, the new settings L1', L2' are equivalent to values obtained by adding deviations ΔL1, ΔL2 to the first and second settings L1, L2, respectively. The metering diagram obtained after the addition of the deviations ΔL1, ΔL2 differs from the metering diagram shown in FIG. 4 in that the micromanipulation region is extended while the full regeneration region is reduced.

In the present embodiment, the deviations ΔL1, ΔL2 are adjusted by a setting change device (setting change means) 29 (see FIG. 2) connected to the vehicle body controller 11. The setting change device 29 according to the present embodiment is of a dial type as shown in FIG. 2. The deviations (ΔL1 and ΔL2) are added to the first and second settings, respectively, in accordance with the rotation amount of a dial. This permits the operator to change, as desired, an operation amount at which the micromanipulation region ends and an operation amount at which the full regeneration region begins. The settings can be changed by rotating the dial. More specifically, when, for instance, the dial is rotated clockwise from a reference position, the new settings are obtained by adding deviations proportional to the rotation amount to the first and second settings L1, L2. When, on the other hand, the dial is rotated counterclockwise from the reference position, the new settings are obtained by subtracting deviations proportional to the rotation amount from the first and second settings L1, L2.

When the first and second settings L1, L2 are changeable as described above, the operation amount at which the micromanipulation region ends and the operation amount at which the full regeneration region begins can be easily changed in accordance with the preference of the operator and with the work to be performed. Therefore, the operator can maintain a desired balance between the micromanipulation capability and the regeneration of energy.

The setting change device 29 described above operates so that a single rotation of the dial changes both the first and second settings L1, L2. However, an alternative is to use a different setting change device that changes at least one of the first and second settings L1, L2 or changes the first and second settings L1, L2 on an individual basis.

When the method described above is used, the rotation amount of the setting change device 29 is adjusted to change the first and second settings L1, L2 as needed for changing the micromanipulation region and the full regeneration region. However, an alternative configuration may be employed so that the micromanipulation region and the full regeneration region can be changed by switching from the settings L1, L2 to different settings (L1', L2') in compliance with an instruction from the operator. More specifically, the motive power regeneration system may be configured to store the first setting L1, a first alternative setting L1' for the first setting L1, the second setting L2, and a second alternative setting L2' for the second setting L2 in the storage unit 105 of the vehicle body controller 11 and switch the settings for computing the returning fluid flow rates Q1, Q2 between the settings L1, L2 and the alternative settings L1', L2' in accordance with the position (ON or OFF) selected on a setting changeover device 30 (see FIG. 2) that is mounted on the control lever of the operating apparatus 4A and connected to the vehicle body controller 11.

When the motive power regeneration system is configured as described above, the work efficiency can be enhanced. More specifically, the above-described configuration makes it possible, for instance, to use the settings L1, L2 for a main operation and use the alternative settings L1', L2' for an auxiliary operation that is temporarily performed between one main operation and another main operation. Further, when the main operations and auxiliary operations are to be successively performed, the region (micromanipulation region or full regeneration region) appropriate for the operation to be performed can be selected simply by changing the position selected on the setting changeover device 30.

In the above description, it is assumed that switching is made between the settings L1, L2 and the alternative settings L1', L2'. Alternatively, however, only one of the two settings L1, L2 may be changed to its alternative setting. Another alternative is to exercise control in accordance with the metering diagram shown in FIG. 4 under normal conditions and, when the setting changeover device 30 is activated, switch to a control mode in which the returning fluid flows into only the flow regulating circuit 54 in all the regions of the operation amount of the operating apparatus 4A without allowing the returning fluid to flow into the regeneration circuit 53.

The present invention is not limited to the embodiments described above, but extends to various modifications that nevertheless fall within the scope of the appended claims. For example, the above-described embodiments are configured so that the motive power converter 10 coupled to the engine 7 functions as a generator for converting the motive power of the engine 7 to an electrical energy and outputting the electrical energy, for instance, to the inverters 12, 13, and also functions as an electric motor for assist-driving the hydraulic pump 6 by using part of the electrical energy. However, an alternative is to omit the motive power converter 10 and directly couple the hydraulic pump 6 to the engine 7. Similarly, although the above-described embodiments include the electric motor 16 as a driving source for the upper swing structure 1d, a hydraulic motor may alternatively be used in place of the electric motor 16.

DESCRIPTION OF REFERENCE CHARACTERS

1a . . . Boom
3a . . . Boom cylinder
4A . . . Operating apparatus
5A . . . Control valve
6 . . . Hydraulic pump
7 . . . Engine
9 . . . Tank
11 . . . Vehicle body controller
15 . . . Battery
20 . . . Pressure sensor
24 . . . Hydraulic motor
25 . . . Generator
27 . . . Proportional valve
28 . . . Check valve
51 . . . Hydraulic line
52 . . . Branching unit
53 . . . Regeneration circuit
54 . . . Flow regulating circuit
55 . . . Bottom side hydraulic chamber
70 . . . Motive power regeneration system
101 . . . First flow rate computation unit
100 . . . Second flow rate computation unit
102 . . . Motor command value computation unit
103 . . . Proportional valve output value computation unit
105 . . . Storage unit
L1 . . . First setting
L2 . . . Second setting
L1' . . . First alternative setting
L2' . . . Second alternative setting
Q1 . . . Flow regulating circuit flow rate
Q2 . . . Regeneration circuit flow rate

The invention claimed is:

1. A motive power regeneration system for a working machine comprising:
 an operating apparatus that outputs an operation signal according to an operation amount;
 a hydraulic cylinder that performs a telescopic operation in accordance with the operation signal output from the operating apparatus;
 a hydraulic pump that is driven by an engine to supply a hydraulic fluid to the hydraulic cylinder;
 regeneration means that converts to an electrical energy the energy of the returning fluid from a bottom side hydraulic chamber of the hydraulic cylinder;
 a regeneration circuit that is connected to the hydraulic chamber to introduce the returning fluid from the hydraulic chamber to a tank through the regeneration means;
 a flow regulating circuit that is connected to the hydraulic chamber to introduce the returning fluid from the hydraulic chamber to the tank;
 a detector that detects the operation amount of the operating apparatus;
 first flow control means that controls the flow rate on the regeneration circuit in accordance with the operation amount detected by the detector and with a first flow rate setting which varies with the operation amount of the operating apparatus; and
 second flow control means that controls the flow rate on the flow regulating circuit in accordance with the operation amount detected by the detector and with a second flow rate setting which varies with the operation amount of the operating apparatus.

2. The motive power regeneration system according to claim 1, wherein the sum of the first and second flow rate settings increases with an increase in the operation amount of the operating apparatus.

3. The motive power regeneration system according to claim 2,
 wherein the first flow rate setting remains at zero when the operation amount of the operating apparatus is smaller than a first setting and increases with an increase in the operation amount of the operating apparatus when the operation amount of the operating apparatus is not smaller than the first setting, and
 wherein the second flow rate setting increases with an increase in the operation amount of the operating apparatus when the operation amount of the operating apparatus is smaller than the first setting, decreases with an increase in the operation amount of the operating apparatus when the operation amount of the operating apparatus is not smaller than the first setting and is smaller than a second setting, and remains at zero when the operation amount of the operating apparatus is not smaller than the second setting.

4. The motive power regeneration system according to claim 3, further comprising:
 setting change means that changes at least either the first setting or the second setting to a different value.

5. The motive power regeneration system according to claim 3, further comprising:
 setting changeover means that switches at least either the first setting or the second setting to a different value.

* * * * *